United States Patent [19]

Sporre

[11] 4,410,185

[45] Oct. 18, 1983

[54] METHOD FOR SEALING A SPACE BETWEEN TWO SEALING SURFACES AND A SEALING DEVICE FOR CARRYING THE METHOD INTO EFFECT

[76] Inventor: Sten Sporre, Storgatan 25, S-330 12 Forsheda, Sweden

[21] Appl. No.: 370,072

[22] Filed: Apr. 20, 1982

[30] Foreign Application Priority Data

Apr. 23, 1981 [SE] Sweden .............................. 8102578

[51] Int. Cl.³ .............................................. F16J 15/32
[52] U.S. Cl. .......................................... 277/1; 206/69; 206/303; 277/207 A
[58] Field of Search ................. 184/1 R; 206/303, 69; 277/207, 207 A

[56] References Cited

U.S. PATENT DOCUMENTS

| | | | |
|---|---|---|---|
| 1,813,178 | 7/1931 | Lindsley | 206/303 |
| 2,690,253 | 9/1954 | Francois | 206/303 |
| 3,136,417 | 6/1964 | Clinch | 206/69 |
| 3,214,010 | 10/1965 | Sunshine | 206/303 |
| 3,282,414 | 11/1966 | Penksa | 206/69 |
| 3,510,140 | 5/1970 | Hermann | 277/207 A |
| 4,365,818 | 12/1982 | Tolliver | 277/1 |

Primary Examiner—Robert I. Smith
Attorney, Agent, or Firm—Holman & Stern

[57] ABSTRACT

The invention relates to a method of sealing the space between two substantially coaxial sealing surfaces (24 and 30) which are insertable one in the other, preferably for sealing the space between a socket and a spigot end of a pipe joint.

Before the sealing surfaces are inserted one into the other a sealing ring (2) is positioned in connection with one of the sealing surfaces, the sealing ring being thereby enclosed in or being thereby enclosed into a covering (12), which contains a lubricant (18). The insertion of the sealing surfaces one in the other is facilitated either by the fact that the covering (12) is broken so that the lubricant is made accessible at surfaces of the joint sliding against each other and/or by the fact that a portion of the covering slides between the sealing ring and the sealing surface or the sealing surfaces.

15 Claims, 8 Drawing Figures

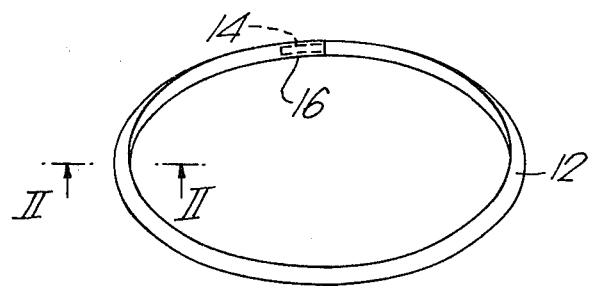
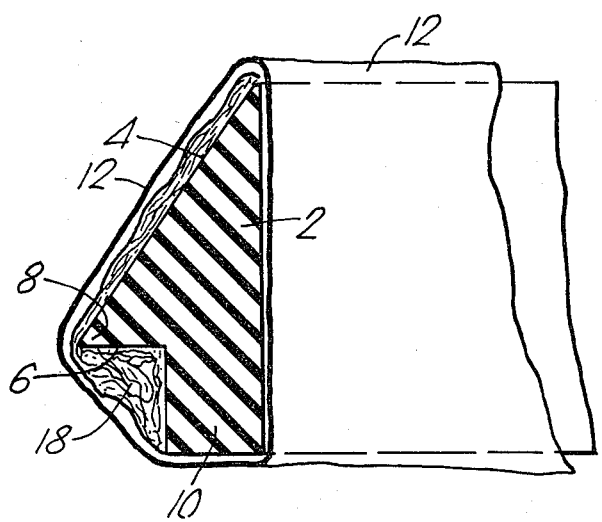

METHOD FOR SEALING A SPACE BETWEEN TWO SEALING SURFACES AND A SEALING DEVICE FOR CARRYING THE METHOD INTO EFFECT

The present invention relates to a method for sealing a space between two substantially coaxial sealing surfaces which are insertable one in the other, and a sealing device for carrying the method into effect.

The space between a socket and a spigot of a pipe joint is usually sealed by means of a sealing ring which is constituted by a rolling ring or a sliding ring. The present invention relates to a device for sealing the space between the sealing surfaces by means of a sliding ring, i.e. a sealing ring providing for a sliding motion between the sealing ring and one of the sealing surfaces and/or between two sliding surfaces of the sealing ring during the insertion of one of the sealing surfaces into the other. In order to provide that the sliding takes place without involving too great frictional forces it is required that the surfaces sliding against each other are supplied with a lubricant. The lubricant can be applied in connection with the jointing operation itself, the sealing ring thereby being usually forced onto a spigot end and the lubricant being thereupon applied before the sealing surfaces are inserted one in the other. It is also possible to deliver the sealing rings already provided with lubricant to the place where the rings are to be used. In the last-mentioned case it is of course necessary to pack the sealing ring in any suitable way so that the lubricant does not disappear during the transportation and is not contaminated. The previously known sealing rings of the type, in which the sliding takes place between two sliding surfaces within the sealing ring, have the drawback that they are expensive and difficult to manufacture.

The object of the present invention is to provide an improved method for sealing the space between two substantially coaxial sealing surfaces which are insertable one in the other by means of a sliding sealing ring.

According to the present invention there is provided a method for sealing the space between two substantially coaxial sealing surfaces which are insertable one in the other, preferably for sealing the space between a socket and a spigot in a pipe joint, wherein a sealing ring is positioned in connection with one of the sealing surfaces before the sealing surfaces are inserted one in the other and the sealing ring takes a compressed position between the sealing surfaces during the insertion of one of the sealing surfaces into the other, the method being characterized in that the sealing ring is enclosed by or within a covering while being positioned in connection with one of the sealing surfaces, said covering containing a lubricant, and that the insertion of one of the sealing surfaces into the other is facilitated by the fact that the covering is broken in connection with said insertion and the lubricant in the covering is thereby made accessible and/or by the fact that a portion of the covering slides between the sealing ring and the sealing surface or the sealing surfaces.

When practising the method according to the invention the sealing ring can have a simple sectional shape which makes the manufacturing of the sealing ring less expensive.

In an embodiment of the invention the sealing ring is forced onto a sealing surface of the spigot end of a pipe, while the sealing ring is enclosed in the covering containing the lubricant, whereby the lubricant is made accessible for reducing the friction between the sealing ring and the sealing surface of the pipe socket by the fact that the covering is broken during the insertion of the sealing surface of the spigot end into the sealing surface of the socket.

In accordance with the invention it is also possible to provide the sealing ring and the lubricant in a covering which is constituted by a recess in a wall forming one of the sealing surfaces and an element closing said recess, the element closing the recess being removed immediately before or in connection with the insertion of one of the sealing surfaces into the other sealing surface.

The invention also relates to a sealing device for sealing the space between two substantially coaxial sealing surfaces which are insertable one in the other, preferably for sealing the space between a socket and a spigot end of a pipe joint. The sealing device according to the invention comprises a sealing ring enclosed in a covering containing a lubricant and is characterized in that the sealing ring is adapted to be positioned or is positioned in connection with one of the sealing surfaces and that the covering is adapted to be broken in connection with the insertion of the sealing surfaces in order to make the lubricant in the covering accessible.

In a preferred embodiment the sealing ring according to the invention consists of a tube, preferably a tube manufactured from a thin plastic material, having overlapping end portions.

The invention is described in the following with reference to the accompanying drawings.

FIG. 1 is a perspective view illustrating a sealing device for carrying the method according to the invention into effect.

FIG. 2 is a fragmentary, cross-sectional view of the sealing device according to FIG. 1 taken on line II—II.

Figure 3:
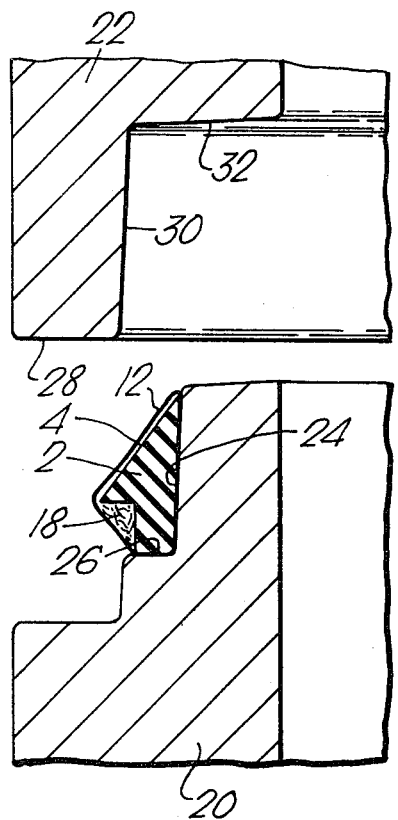
FIGS. 3 and 4 illustrate the accomplishment of the method for sealing the space between the socket and the spigot of a pipe joint.

FIGS. 1 and 2 illustrate an embodiment of a sealing device according to the invention. The sealing device is adapted for sealing the space between two substantially coaxial sealing surfaces which are insertable one in the other, preferably for sealing the space between the socket and the spigot in a pipe joint. The sealing device comprises a sealing ring 2, the cross-section thereof having substantially the shape of half an arrow-head. The sealing ring has an inclined surface 4 and a shoulder 6 defining a projection 8. The sealing ring 2 also comprises a support portion 10 which is connected with the shoulder 6.

The sealing device according to the invention also comprises a covering 12 consisting of a thin-walled tube preferably manufactured from a plastic material. The covering 12 encloses the sealing ring 2 and has its end portions 14 and 16 so positioned in relation to each other that the first end portion 14 projects into the second end portion 16 a distance which is sufficient for allowing the sealing device to be expanded without causing that the sealing ring 2 is exposed in the area of the connection of the end portions 14 and 16 with each other.

In the covering 12 there is provided a lubricant 18 which has the object of facilitating the sliding of the sealing device against a sealing surface.

Figure 4:
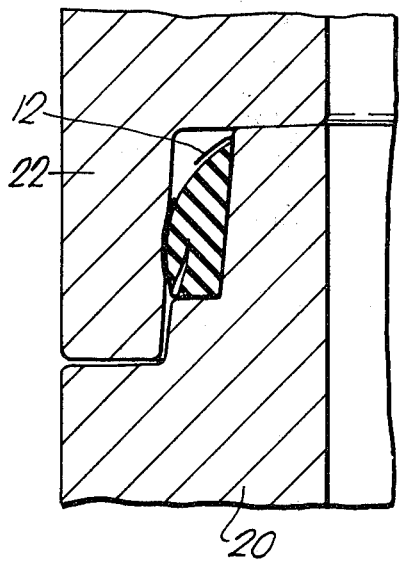

FIGS. 3 and 4 illustrate the use of the sealing device according to the invention for sealing the space between a lower well ring 20 and an upper well ring 22. The lower well ring 20 has a stepped shape at its upper end including a substantially cylindrical or slightly conical lower surface 24 and a substantially flat, annular support lower surface 26. The upper well ring 22 which shall be positioned on the lower well ring 20 has at its lower end a first substantially flat, annular upper surface 28, a substantially cylindrical or slightly conical upper surface 30 and a second substantially flat, annular upper surface 32.

In accomplishing the method for sealing the space between the sealing surfaces 24 and 30 of the well rings 20 and 22 by means of a sealing device according to the invention the sealing device which is constituted by the sealing ring 2 and the covering 20 with the lubricant provided therein is forced onto the sealing surface 24 of the lower well ring 20, the lower surface of the sealing device constituted by the support portion 10 and the adjacent portion of the covering 12 thereby engaging the support surface 26 of the lower well ring 20. This phase of the pipe jointing is illustrated in FIG. 3. When the upper well ring 22 is lowered in the direction of the sealing device the inner edge of the surface 28 of the upper well ring is guided against the portion of the covering 20 which is positioned adjacent the inclined surface 4 of the sealing ring 2. In the further movement of the upper well ring 22 downwards the covering 12 is also displaced downwards by the well ring 22 within the area where the well ring 22 engages the covering, the covering sliding against the inclined surface 4 of the sealing ring 2 within said area. Thereby, the sliding between the covering 12 and the inclined surface 4 is facilitated by the lubricant 18 positioned in the covering 12. The sliding of the covering 12 against the inclined surface 4 continues until the covering 4 engages the upper end portion of the sealing ring 2, the covering thereby being broken so that the inclined surface 4 of the sealing ring 2 is partially uncovered. When the upper well ring 22 continues its lowering motion the sealing surface 30 engages the covering 12 as well as the uncovered, inclined surface 4 of the sealing ring 2, the sliding thereby being facilitated by the lubricant 18 which is accessible at said surfaces.

The construction of the covering 12 will at least partly determine the course of action when the well rings are jointed, the breaking of the covering 12 being determined partly by the peripheral size of the covering and partly by the thickness of the covering. Preferably the peripheral size of the covering is such that the covering is rather closely connected with the outer surface of the sealing ring 2 and the covering 12 has a wall thickness of 0.01–0.2 mm, for example about 0.07 mm.

Figure 5:
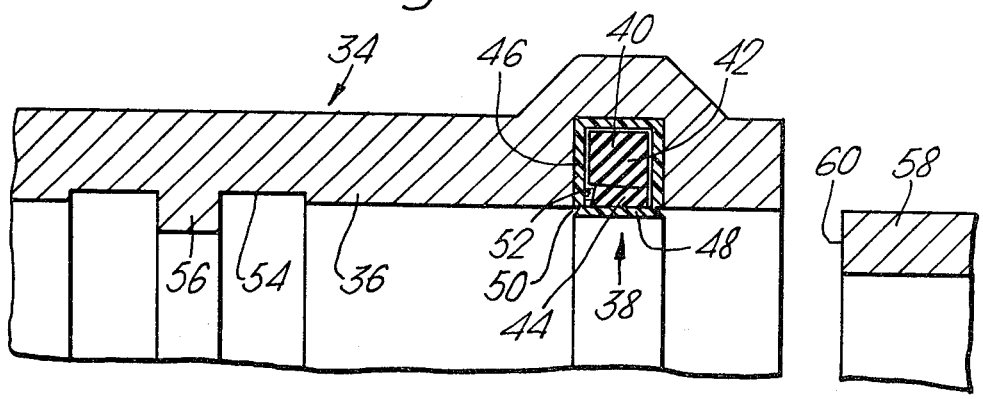
FIGS. 5 and 6 illustrate another embodiment of a method for sealing the space between the socket and the spigot in a pipe joint.
Figure 6:
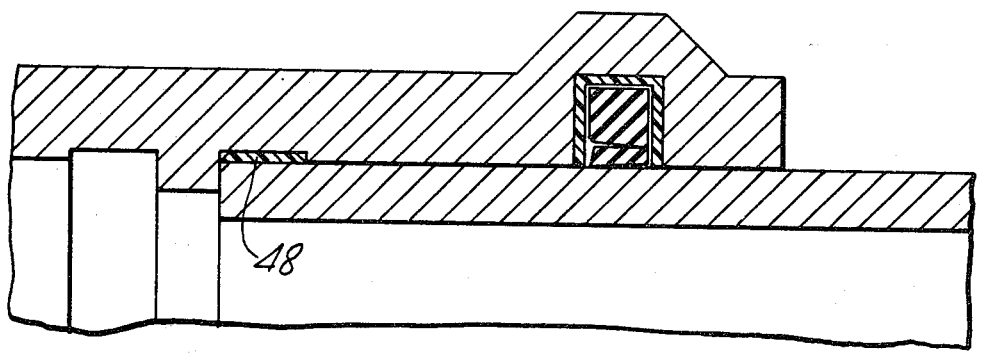

FIGS. 5 and 6 illustrate a further embodiment of a sealing device for carrying the method according to the invention into effect. FIGS. 5 and 6 show a sealing device according to the invention in connection with a pipe socket 34, an end portion of a wall 36 of the pipe socket 34 being shown in an axial section. In the wall 36 of the pipe socket 34 there is positioned a sealing device 38 according to the invention. The sealing device 38 comprises a sealing ring 40 having a main portion 42 and a lip 44. The sealing ring 40 is enclosed in a covering 46, consisting of a relatively thin-walled plastic material completely enclosing the sealing ring 40. At its inner periphery the covering 40 has a wall element 48 which is connected with the rest of the walls of the covering 46 while forming kerfs 50.

In addition to the sealing ring 40 the covering 46 also contains a lubricant 52. The sealing device 38 can be included in the wall 36 of the pipe socket 34 in different ways. Thus, the sealing device 38 can be forced onto a mandrel, whereupon the pipe wall 36 is formed around the sealing device 38 which in this way is connected with the pipe wall. It is of course also possible to position the sealing device 38 in a groove formed in the wall 36 in a conventional way.

Axially inside the sealing device 38 the pipe socket 34 has an inner, peripheral groove 54 and an inwards projecting engagement portion 56.

When mounting a pipe joint according to the invention a spigot end 58 of a pipe is inserted into the socket 34. The spigot end 58 has such a diameter that the edge surface 60 thereof will engage the wall element 48 of the sealing device 38 at the axially outer edge thereof. Because of the kerfs 50 the wall element 48 will thereby be broken away from the rest of the walls of the covering 46, the wall element 48 being thereby displaced in front of the spigot end 58 into the socket 34. Thereby, the sealing ring 40 is uncovered so that the lip 44 thereof will engage with the outer surface of the spigot end. Because of the fact that the lubricant 52 in the covering 46 is at the same time made accessible the mounting can be conductive while exerting a small axial force as the friction between the sealing ring 40 and the outer surface of the spigot end 58 is substantially reduced.

As appears from FIG. 6 the wall element 48 will be displaced in front of the spigot end 58 until the element 48 is received in the groove 54 in the wall 36 of the socket 34 and the surface 60 of the spigot end 58 engages the engagement portion 56.

In a modified embodiment of the device shown in FIG. 5 the sealing ring 40 can be positioned directly in a groove formed in the wall 36 of the socket 34 without using any covering, whereupon the groove is supplied with lubricant and is closed by means of an element of the same kind as the wall element 48 of the embodiment shown in FIG. 5.

Figure 7:
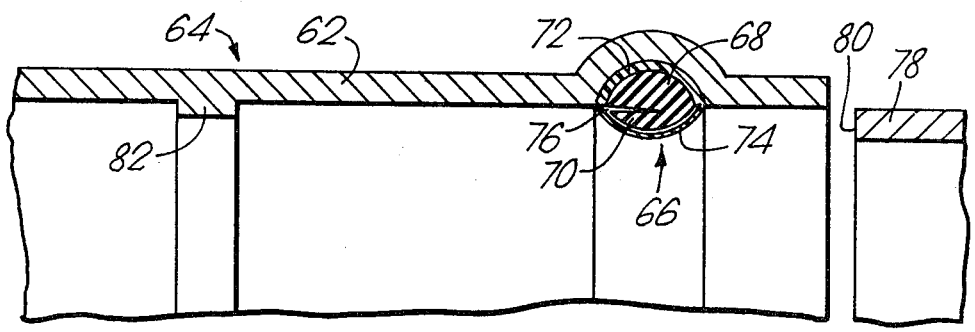
FIGS. 7 and 8 illustrate a further embodiment of a method for sealing the space between a socket and a spigot in a pipe joint.
Figure 8:
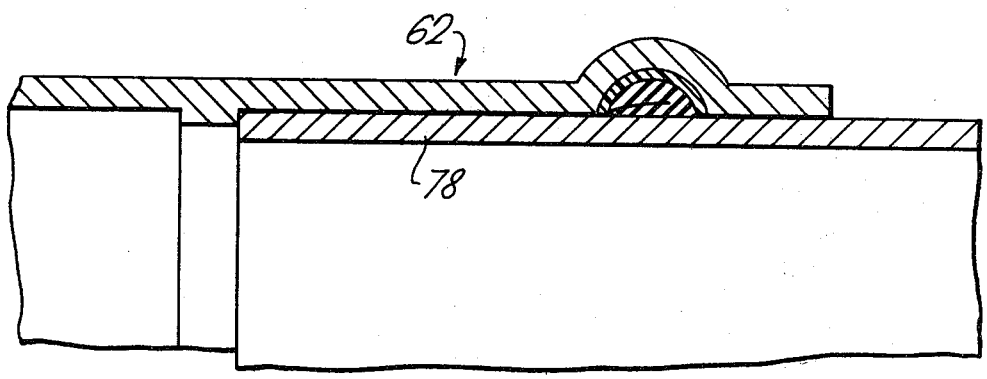

In FIGS. 7 and 8 there is shown a further modified embodiment of the sealing device according to the invention. In the wall 62 of a socket 64 there is formed a groove for receiving a sealing device 66 according to the invention. The sealing device 66 includes a sealing ring 68 having a lip 70 and a covering consisting of a portion 72 engaging the bottom of the groove in the wall 62 and a portion 74 which is connected with the portion 72 and is positioned at the inner peripheral surface of the covering. The portion 72 has greater thickness than the portion 74 which is constituted by a relatively thin foil of plastic material. In the covering consisting of the portions 72 and 74 there is provided a lubricant 76. As is the case in the embodiment according to FIGS. 5 and 6 the sealing device 66 can be connected with the socket 64 in different ways. Thus, the socket 64 can be formed around the sealing device 66, when this is provided on a mandrel, or the sealing device 66 can be positioned in a groove formed in the socket 64.

When a spigot end 78 is inserted into the socket 64, the end surface 80 of the spigot end 78 engages the portion 74 of the covering. Because of the fact that said portion 74 has a relatively small strength said portion will be broken for uncovering the lip 70 of the sealing ring 68 so that the lip can engage with the outer surface of the spigot end 78. When the portion 74 of the covering is broken, the lubricant in the covering will be made accessible, so that the force which is necessary for inserting the spigot end 78 into the socket 64 will be reduced by the fact that the lubricant reduces the friction between the sealing ring 68 and the spigot end 78. The spigot end 78 is inserted so far into the socket 64 that the end surface 80 will engage a shoulder portion 82 in the socket.

The invention can be modified within the scope of the following claims. For example it is possible manually to break the covering of the sealing device before the sealing surfaces are introduced one in the other instead of providing the breaking of the covering through the engagement with the sealing surfaces.

It is also possible to provide the covering enclosing the sealing ring with such a great section in relation to the section of the sealing ring that the covering can slide between the sealing ring and the sealing surface or the sealing surfaces during the whole insertion movement without being subjected to such forces that the covering is broken.

I claim:

1. In a sealed and lubricated coaxial pipe joint formed by connecting an outer socket and an inner spigot with an annular elastic seal between them, the improvement comprising:

an annular sliding sealing ring adapted to be mounted within the joint prior to the connection thereof, and consisting essentially of: (a) an annular elastic core having a radially projecting engagement portion, (b) an annular tearable covering toroidally surrounding said core, and (c) a lubricant annularly positioned between at least a portion of said core and said covering, means for mounting said sealing ring within the joint prior to connection thereof, said means being integral with said socket or spigot, and stop means for preventing insertion beyond a predetermined point, so that insertion of the spigot into the socket will cause the covering of the sealing ring to be engaged and torn at the point of said radially projecting portion, releasing the lubricant to facilitate said insertion and permitting the elastic core to form a seal.

2. The improvement of claim 1 wherein the annular tearable covering consists essentially of a thin-walled plastic material.

3. The improvement of claim 2 wherein the thickness of said covering is from about 0.01 mm to about 0.2 mm.

4. The improvement of claim 2 wherein said covering is thinner at the part thereof adjacent said radially projecting engagement portion of the core.

5. The improvement of claim 4 wherein the lubricant is positioned adjacent the radially projecting engagement portion of the core.

6. The improvement of claim 2 wherein the lubricant is positioned adjacent the radially projecting engagement portion of the core.

7. The improvement of claim 1 or 6 wherein the means for mounting said sealing ring are integral with said spigot and comprise a first annular rabbet of smaller radius having a first generally conical surface and a first flat support surface and a second annular rabbet of larger radius having a second generally conical surface and a second flat support surface, said second rabbet being further from the end of said spigot than said first rabbet, the sealing ring is mounted around the first rabbet of the spigot so that the projecting engagement portion thereof projects outward and extends beyond the plane of the second generally conical surface, and said socket has an insertion stop means comprising an inner annular rabbet complementary to the second annular rabbet of the spigot.

8. The improvement of claim 1 or 6 wherein the means for mounting said sealing ring are integral with said socket and comprise a first inner peripheral groove adapted to hold said sealing ring, the sealing ring is mounted within said groove so that the engagement portion thereof projects inward and extends beyond the edges of the groove, and said socket has an insertion stop means comprising an inward projecting shoulder adapted to be biased against by the leading end of the spigot and located further from the end of said socket than said groove.

9. The improvement of claim 8 further comprising a second inner peripheral groove between the first groove and the stop means, adapted to receive any portion of the sealing ring cover which is displaced by insertion of the spigot.

10. A method of sealing the space between two substantially coaxial sealing surfaces by using the pipe joint of claim 1 comprising inserting the spigot into the socket to cause the covering of the sealing ring to tear at the point of the projecting portion of the elastic core, thereby releasing the lubricant for facilitating further insertion, and continuing the insertion until the stop means is engaged thereby forming a joint wherein the elastic core forms a seal between the spigot and the socket.

11. A method of sealing the space between two substantially coaxial sealing surfaces by using the pipe joint of claim 7 comprising inserting the spigot into the socket to cause the covering of the sealing ring to tear at the point of the projecting portion of the elastic core, thereby releasing the lubricant for facilitating further insertion, and continuing the insertion until the stop means is engaged, thereby forming a joint wherein the elastic core forms a seal between the spigot and the socket.

12. A method of sealing the space between two substantially coaxial sealing surfaces by using the pipe joint of claim 8 comprising inserting the spigot into the socket to cause the covering of the sealing ring to tear at the point of the projecting portion of the elastic core, thereby releasing the lubricant for facilitating further insertion, and continuing the insertion until the stop means is engaged, thereby forming a joint wherein the elastic core forms a seal between the spigot and the socket.

13. A method of sealing the space between two substantially coaxial sealing surfaces by using the pipe joint of claim 9 comprising inserting the spigot into the socket to cause the covering of the sealing ring to tear at the point of the projecting portion of the elastic core, thereby releasing the lubricant for facilitating further insertion, and continuing the insertion until the stop means is engaged, thereby forming a joint wherein the elastic core forms a seal between the spigot and the socket.

14. In a sealed and lubricated coaxial pipe joint formed by connecting an outer socket and an inner spigot with an annular elastic seal between them, the improvement comprising:

an annular sliding sealing ring adapted to be mounted within the joint prior to the connection thereof, and consisting essentially of: (a) an annular elastic core having a radially projecting engagement portion, (b) an annular non-tearable covering toroidally surrounding and peripherally larger than said core, and (c) a lubricant annularly positioned between at least a portion of said core and said covering, means for mounting said sealing ring within the joint prior to connection thereof, said means being integral with said socket or spigot, and stop means for preventing insertion beyond a predetermined point, so that insertion of the spigot into the socket will cause the covering of the sealing ring to be engaged at the point of said radially projecting portion and a portion of said covering to lubricatingly slide unbroken between the socket and the spigot, to facilitate said insertion and permit the elastic core to form a seal.

15. A method of sealing the space between two substantially coaxial sealing surfaces by using the pipe joint of claim 14 comprising:

inserting the spigot into the socket to cause the non-tearable covering of the sealing ring to become engaged at the point of the projecting portion of the elastic core and a portion of said covering to lubricatingly slide unbroken between the socket and the spigot, thereby facilitating further insertion, and continuing the insertion until the stop means is engaged thereby forming a joint wherein the elastic core forms a seal between the spigot and the socket.

* * * * *